United States Patent
Klotz et al.

(10) Patent No.: US 8,015,324 B2
(45) Date of Patent: Sep. 6, 2011

(54) METHOD FOR DATA TRANSMISSION

(75) Inventors: Dieter Klotz, Fürth (DE); Albert Tretter, Pirk (DE)

(73) Assignee: Siemens Aktiengesellschaft, Munich (DE)

( * ) Notice: Subject to any disclaimer, the term of this patent is extended or adjusted under 35 U.S.C. 154(b) by 372 days.

(21) Appl. No.: 12/229,333

(22) Filed: Aug. 21, 2008

(65) Prior Publication Data

US 2009/0055564 A1 Feb. 26, 2009

(30) Foreign Application Priority Data

Aug. 23, 2007 (EP) .................................. 07016558

(51) Int. Cl.
*G06F 13/00* (2006.01)
*G01R 31/08* (2006.01)

(52) U.S. Cl. .......................... 710/33; 710/110; 370/235

(58) Field of Classification Search ................ 710/8–10, 710/29, 30, 31, 33–35, 110, 307; 370/235
See application file for complete search history.

(56) References Cited

U.S. PATENT DOCUMENTS

| | | | | |
|---|---|---|---|---|
| 5,165,019 | A * | 11/1992 | Sweazey | 709/251 |
| 5,457,683 | A * | 10/1995 | Robins | 370/258 |
| 5,901,146 | A * | 5/1999 | Upp | 370/389 |
| 6,104,714 | A * | 8/2000 | Baudelot et al. | 370/396 |
| 6,405,247 | B1 * | 6/2002 | Lawande et al. | 709/221 |
| 6,618,383 | B1 * | 9/2003 | Tomlins | 370/395.5 |
| 6,870,850 | B1 * | 3/2005 | Fichou et al. | 370/400 |
| 7,050,455 | B2 * | 5/2006 | Nishihara | 370/466 |
| 7,133,407 | B2 * | 11/2006 | Jinzaki et al. | 370/395.64 |
| 7,441,048 | B2 * | 10/2008 | Arnold et al. | 709/248 |
| 7,483,421 | B2 * | 1/2009 | Compton | 370/389 |
| 7,499,500 | B2 * | 3/2009 | Page | 375/295 |
| 2004/0015604 | A1 * | 1/2004 | Osakabe et al. | 709/236 |
| 2005/0232296 | A1 * | 10/2005 | Schultze et al. | 370/442 |
| 2006/0083229 | A1 * | 4/2006 | Jordan et al. | 370/389 |
| 2006/0083250 | A1 * | 4/2006 | Jordan et al. | 370/400 |
| 2007/0008908 | A1 | 1/2007 | Rainer et al. | |
| 2007/0058682 | A1 * | 3/2007 | Albrecht et al. | 370/503 |
| 2008/0005428 | A1 * | 1/2008 | Maul et al. | 710/62 |
| 2008/0080521 | A1 * | 4/2008 | Sichner et al. | 370/400 |
| 2008/0228978 | A1 * | 9/2008 | Wei et al. | 710/244 |
| 2009/0106755 | A1 * | 4/2009 | Chandhoke | 718/100 |

FOREIGN PATENT DOCUMENTS

| | | |
|---|---|---|
| DE | 199 22 497 A1 | 11/2000 |
| EP | 1 748 338 A1 | 1/2007 |
| WO | WO 03/061211 A1 | 7/2003 |
| WO | WO 2005/034439 A2 | 4/2005 |

OTHER PUBLICATIONS

Limits of Increasing the Performance of Industrial Ethernet Protocols, IEEE, 2007.*

* cited by examiner

*Primary Examiner* — Khanh Dang

(57) ABSTRACT

The invention relates to a method for data transmission in a serial bus system comprising a control unit and bus users. The method comprises steps: receiving a first data telegram by a bus user from the control unit, wherein the data telegram has a data field containing output data; reading out the data field intended for the bus user from the first data telegram; preparing input data as a response to the read out data field; checking whether a predefined criterion is met, wherein if the criterion is met a second data telegram is newly generated and the input data is attached to the second data telegram and if the criterion is not met, the input data is attached to a data telegram previously received from another bus user; and transmitting the input data to the control unit by the second data telegram.

2 Claims, 4 Drawing Sheets

METHOD FOR DATA TRANSMISSION

CROSS REFERENCE TO RELATED APPLICATIONS

This application claims priority of European application No. 07016558.4 filed Aug. 23, 2007, which is incorporated by reference herein in its entirety.

FIELD OF THE INVENTION

The invention relates to a method for data transmission in a serial bus system comprising a control unit and bus users.

BACKGROUND OF THE INVENTION

The pace of change in automation technology continues unabated. Downward pressure on costs, the ever-increasing expectations in terms of process flow and product quality as well as the demand for the most highly flexible production facilities are the market-led driving forces to which the manufacturers of devices, systems and plants are responding with a fast rate of innovation.

Of crucial importance here is the advancement of automation technology, with field buses playing a key role in this technology. Field buses provide an efficient means of transmitting data to various automation devices in order to enable said devices to be controlled on a real-time or virtually real-time basis.

To ensure highly efficient data transmission, various system bus concepts have been developed which are commercially available under the name "Profibus", "PROFINET", "Interbus", "EtherCAT". The speed of the bus system has been increased by, among other things, transmitting the data in a so-called "broadcast telegram" for which payload data is combined into a packet in order to be then transmitted serially to the individual bus users, instead of transmitting the data individually to individual bus users. In such a system it is possible for the bus users to be disposed in a ring arrangement so that the master-initiated broadcast telegram is transmitted round all the modules, units, etc. This provides the possibility of optimizing the transmission of payload data for a linear structure of this kind.

DE 10 2005 054202 B3, for example, discloses a user device of a serial bus system, a bus system with a user device of this kind and a digital input/output card.

DE 199 22 497 A1 discloses a method for transmitting data between at least two users of a bus system, each user having a logic unit, a memory unit and an interface. After transmission of start information to all the users in the sequence of the consecutive data field positions, data fields are processed position by position by each user writing data to the data field position or positions assigned to it.

WO 03/061211 A1 discloses an installation for transmitting data in a serial bus with a control device which has a transceiver unit for data fields combined to form a data frame, and with bus users which possess an evaluation circuit for reading data fields into and out of the data frame.

SUMMARY OF THE INVENTION

The object of the present invention is to create an improved method for data transmission in a serial bus system, an improved bus user for a serial bus system, and an improved network.

The underlying objects of the invention are each solved by the features of the independent claims. Preferred embodiments of the invention are set forth in the dependent claims.

According to the invention, a method for data transmission in a serial bus system is created wherein the bus system has a control unit and a bus user. The method comprises the steps of a bus user receiving a first data telegram from the control unit, said data telegram having at least one data field, and output data being contained in said data field. In a further step, the data field intended for the bus user is read out of the first data telegram and input data is prepared in response to the read-out data field. A check is now performed to ascertain whether a predefined criterion is met and, if so, a second data telegram is newly generated and the input data is attached to the data telegram. However, if the criterion is not met, the input data is attached to a data telegram previously received from another of the bus users, thereby generating a second data telegram. Finally the input data is sent to the control unit by means of the second data telegram. A bus user may prepare input data in response to receiving the first data telegram even if the first data telegram contains no output data for that user.

The advantage of the inventive data transmission method is that it ensures highly efficient data transmission while nevertheless providing a high degree of fail safety. Moreover, data transmission delays can be effectively avoided. For example, the receiving of the first data telegram containing data fields with output data for the bus user avoids individual communication between the bus user and the control unit: the control unit sends collected information serially in a single data telegram to all the bus users, every bus user then being able to read out the control unit output data intended for it from the data telegram. Each bus user checks for itself, on the basis of the serial arrangement, whether data fields intended for it are contained in the data telegram. If this is the case, the bus user reads out the data fields or data field. Regardless of the presence of data fields for an individual bus user, each bus user forwards a received data telegram directly to the next serially connected bus user, so that virtually no delay arises here.

Now that the bus user has therefore received the output data intended for it, it is able to request corresponding input data, e.g. for an automation device. As soon as this input data is available to the bus user, the latter now has two options for proceeding to send the input data to the control unit, the two options being selected on the basis of a predefined criterion. If this criterion is met, a second data telegram is newly generated and the input data collected from the automation device is attached to the second data telegram and then transmitted to the control unit. If, however, the criterion is not met, the system waits until a data telegram is received from another of the bus users. This data telegram of the other bus user then contains at least one data field with input data of said other bus user. The bus user is now able to augment the received data telegram by attaching its input data received from the automation device to the already existing data telegram, thereby generating a second data telegram which can in turn be sent back to the control unit.

The essential difference between the two options for sending input data back to the control unit is that, in the first case, if the criterion is met, the bus user sends back its response to the control unit independently of other bus users. In the second case, however, similarly to in the case of the first telegram, a data field with appropriate input data is attached to an already existing data telegram, thereby increasing its size. If these two possibilities are now extended to a plurality of bus users, it becomes clear that in the first case a so-called response cascade is initiated, as each bus user sends its respective input data present at the bus user back to the control unit on an individual basis. In the second case, on the other hand, the control unit only receives one large data telegram containing the input data of a plurality of bus users.

The advantage of a large data telegram which avoids a response cascade is that the data transmission volume on the serial bus is significantly reduced. On the other hand, in the first case it is possible to ensure that input data is transmitted to the control unit independently of other bus users. This is particularly relevant if one of the bus users has a somewhat longer response time for collecting input data from an automation device, the consequence of which would be that in the second case, due to the appending of data fields to an already existing data telegram, said data telegram would be held up at the somewhat slower responding bus user until that bus user has attached his data field to said data telegram. However, this would considerably impair the real-time capability of the serial bus system.

According to one embodiment of the invention, the transmit criterion is a delay time from receipt of the first data telegram. According to another embodiment of the invention, the transmit criterion is the urgency of the input data to be transmitted. Particularly if the transmit criterion in the form of a delay time from receiving the first data telegram is used, it is possible to maintain the real-time capability of the serial bus system itself under difficult conditions. Thus it is possible, for example, if an automation component does not supply input data within a specified time interval, for the bus user to be configured to generate a new second data telegram. The consequence of this is that a bus user immediately forwards an incoming data telegram from another bus user unchanged to the next bus user in the serial bus chain, thereby avoiding any delay due to a waiting time for the automation component to respond by supplying the input data to the bus user. However, if the response time of the automation component for supplying the relevant input data is below a specified time constant, the bus user is configured such that, to increase efficiency, it waits for a data telegram from another of the bus users to arrive in order to append to said data telegram a data field containing input data coming from the automation component. This avoids sending an individual data telegram, thereby minimizing the signal volume on the serial bus.

It is of course likewise possible to select other options for transmit criteria. One possibility, as mentioned above, is the urgency of the input data to be transmitted. Thus it is possible, for example, for the control unit to interrogate the bus users to ascertain their current operating status. If the operating status of a bus user is "OK", there is no increased urgency to transmit this status to the control unit, as the latter assumes by default that the automation devices connected to the bus user are fully operational. However, if "malfunction" information is present at one of the bus users, there is increased urgency to transmit this information immediately to the control unit so that the latter can then take appropriate action. In this case it is advisable for the bus user to immediately generate an appropriate data telegram independently of other bus users, append relevant e.g. diagnostic input data thereto and send the resulting (second) data telegram to the control unit.

According to another embodiment of the invention, each of the bus users has a unique identifier, said bus user identifier being added to the second data telegram together with the input data. This has the advantage that the second data telegram arriving at the control unit can be uniquely assigned to corresponding bus users in respect of their data fields. As each data telegram also has a header in addition to the payload data, it is possible to communicate to the control unit additional information concerning the use of the payload data (input data). For example, it is possible for the same header to be contained in the header or rather to correspond to the same header as that already contained in the output data telegram that was previously received by the bus user. It is therefore possible to assign input data from a bus user according to the output data previously sent to the bus user.

According to another embodiment it is alternatively also possible, in an initialization process, for the users to be given tables transmitted by the control unit which assign to a corresponding header a corresponding data field offset and an associated length of the data to be tapped off. In addition, it is possible for an output offset to be individually assigned to a corresponding header (for an individual bus user), the following data transmission procedure being implementable: a bus user receives a first data telegram and compares the header of the data telegram with a header residing in a table stored at the bus user. The bus user therefore then reads out from the table a corresponding offset associated with the header and a data length value in order access the first data telegram. A number of data fields or an individual data field with the length specified by the table is then read out of the first data telegram at the data offset from the table.

This has the advantage that, at least for transmission of the first data telegram, additional bus user identifiers do not need to be sent in the first data telegram together with the data fields, thereby further reducing the transmitted data volume. In addition, the offset, relative to the start of the local output data image of the bus user, is read out of the table for the given header, which means that the bus user is immediately able to read input data directly from a local memory area at the given position.

It is additionally possible to store a plurality of output data image offsets assigned to a header in the table, these being tailored to the content of the data fields intended for a bus user. This makes it possible to combine an individual header individually with the input data interrogations specified for output data. Thus, for example, the header of the first data telegram can effect interrogation of temperature values of an automation device generally, whereas in the data field for a bus user a particular sensor "Sensor 1" is additionally specified as output data. Instead of the bus user now laboriously evaluating the information contained in the data field, the bus user merely reads out from its table, via the header and the "Sensor 1" value given for the data field, an offset address for its memory at which the "Sensor 1" has stored its temperature information, thereupon immediately accessing the memory area specified by the offset and reading out the corresponding (temperature) information already present there. This means that this information is available immediately after the first data telegram is received at the bus user.

However, the method involving the use of a table with offsets predefined for headers, relating both to the start of the output data in a data telegram and to the start of a local output data image in a bus user memory, cannot be readily applied to second data telegrams which must be sent back to the control unit. This is only possible if a second data telegram is guaranteed to contain responses in the form of data fields completely in the exact sequence in which the individual bus users were serially addressed previously by means of the first data telegram. As soon as, on the basis of a fulfilled criterion at one of the bus users, the latter does not append his input data to the data telegram to generate the second data telegram, this information is missing, so that a table present at the control unit generates an incorrect access to the data fields of a bus user with corresponding offset values, since in that case the control unit wants to access data fields of a bus user in the second data telegram which said bus user has not appended to the data telegram at all. For this reason it is preferable in this case to either denote the completeness of a second data telegram accordingly in respect of attached data fields with input data of all the bus users or, as already mentioned, to add the respective identifier of the bus user to the second data telegram for the input data, a table with offset values being dispensed with in this case.

In the event that the majority of bus users regularly add their input data to a data telegram previously received from another of the bus users and that individual transmission of individual telegrams from the bus users to the control unit tends to be an exception, another suitable alternative is available: this requires that the table provided for reception of the first data telegrams as described above is used for transmission of the second data telegrams. In the event that an additional second telegram is newly generated if one of the above-mentioned criteria is met, the input data is added to the second data telegram together with the bus user's unique identifier. Other bus users in the serial chain of bus users can append further input data to this second data telegram—but provided that the bus user identifier is also appended along with the input data in each case.

For all other cases, if a bus user receives a data telegram which has input data in the sequence corresponding to the table stored at the control unit, in the event of non-availability of corresponding input data or rather in the event of input data already having been sent previously to the control unit, each bus user must now, however, add to the offset position provided for it a corresponding length of data with a predefined identifier (e.g. a number of continuous zeros). Also possible is repeatedly adding such data that has already been sent previously to the control unit in another data telegram, thereby unambiguously ensuring that the control unit is able to correctly read and assign data fields to bus users.

In order now to increase the efficiency of the data transmission method in a serial bus still further, it is possible to carry out sub-addressings or partial addressings of bus users. For example, instead of addressing all bus users in each message cycle, logical "subsystems" can be formed which can be addressed accordingly, each of said subsystems being assigned a unique identifier which, as already shown above, can be loaded in a table for the respective bus user or rather for the control unit as part of an initialization phase. This means that, in the case of subsystems, a subsystem identifier with which a subsystem branch can be unambiguously identified can exist in addition to the bus user identifier.

According to one embodiment of the invention, the data transmission method also comprises the steps of checking the total size of the second data telegram and the input data, which involves checking appendings of input data to the second data telegram. The method also comprises the step of dividing the input data between the second data telegram and/or at least one other data telegram if the total size of the second data telegram and input data exceeds a predefined maximum size.

This enables the size of data telegrams to be flexibly matched to the bus protocol used with correspondingly predefined maximum protocol lengths. If e.g. the appending of input data to an existing data telegram were to result in an excessively long protocol length, either the input data to be appended could be split between the already existing data telegram and another data telegram or the input data could be appended to a completely new data telegram.

According to another embodiment of the invention, check data is attached to the second data telegram together with the input data. However, if the second data telegram received by one of the bus users contains incorrect check data, after attachment of the input data the check data of the second data telegram is deliberately corrupted by the bus user. Said check data can be e.g. a cyclic redundancy check (CRC). This enables evaluation of invalid data because of reception or transmission errors to be prevented. If a bus user which has attached input data to a received data telegram detects a receive error (e.g. calculated CRC of the received data does not tally with the received CRC), said bus user is not allowed to use the calculated CRC but must transmit a deliberately "corrupted" CRC. The other telegram recipients can likewise detect the receive error from this corrupted CRC.

According to another embodiment of the invention, the output direction of the input data transmitted by means of the second data telegram differs from the input direction of the first data telegram. The advantage of this is that it ensures purely serial operation of the bus system without the necessity of a ring arrangement of the bus users. It should be noted at this juncture that a last bus user in the serial chain of bus users must be configured in a special way, since because of the predefined output direction of the second data telegram that user will obviously never receive input data from a downstream bus user. It is possible, in an initialization phase, to inform the last bus user of a serial chain of bus users that it always generates a new second data telegram and transmits it to corresponding upstream bus users of the bus system. Alternatively, the users can be configured such that the last user in each case automatically detects that there are no more users downstream thereof and it therefore operates as initiator for the input direction.

According to one embodiment of the invention, the method also comprises the step of reading offset information stored with the bus user, said offset information indicating the position, in the first data telegram, of the data field intended for the bus user, as already discussed above.

In another aspect, the invention relates to a bus user for a serial bus system, the bus system having a control unit with means whereby a first data telegram from the control unit can be received by the bus user, said data telegram having at least one data field, and said data field containing output data. The bus user additionally has means of reading out the data field intended for the bus user from the first data telegram and means of providing input data in response to the data field read out. The bus user also comprises means of generating a new data telegram, means for adding the input data to a data telegram and means of checking whether a predefined criterion has been met. If such a predefined criterion is fulfilled, a second data telegram is newly generated and the input data is attached to the second data telegram. If the criterion is not fulfilled, the input data is attached to another data telegram received from another bus user and therefore a second data telegram is generated. The bus user also comprises means of transmitting the input data to the control unit by means of the second data telegram.

According to another embodiment of the invention, the bus user comprises means of checking the total size of the second data telegram and input data, this checking taking place before the input data is appended to the second data telegram, and means for splitting the input data between the second data telegram and/or at least one other data telegram if the total size of the second data telegram and input data exceeds a specified maximum size.

According to one embodiment of the invention, the bus user additionally comprises means of determining check data and appending the check data to the second telegram together with the input data.

According to one embodiment of the invention, the bus user further comprises means of reading offset information stored at the bus user, said offset information indicating the position of the data field intended for the bus user in the first data telegram.

According to one embodiment of the invention, the bus user also has means of receiving the offset information from the control unit. As stated, this can take place during an initialization phase in which the control unit is synchronized with the bus users.

In another aspect, the invention relates to a serial bus system wherein said bus system comprises a control unit and at least one bus user according to the invention.

According to another embodiment of the invention, the network also comprises a distribution module, wherein the distribution module is designed for the connection of a plurality of bus users, said distribution module distributing data telegrams to the connected bus users. The distribution module is preferably designed such that data telegrams received by the bus users are only forwarded to the control unit if the data telegrams are intended for the control unit. This is relevant for the reason that the flow direction of second data telegrams over the shortest path from the bus users to the control unit is always retained. This ensures that second telegrams transmitted from any bus user to the control unit are not, because of incorrect distribution, received at another bus user connected to the distribution module, whereupon said bus user would feel compelled to forward the received data telegram (possibly with further input data attached) to another bus user in the opposite direction to the receive direction. This would mean that the corresponding data telegram would be sent on from bus user to bus user in the opposite direction to the control unit without ever being received at the control unit.

By ensuring that data telegrams received by the bus users are forwarded exclusively to the control unit by the distribution unit if the data telegrams are also intended for the control unit, it is possible to connect a plurality of bus users to such a distribution module. For example, it is possible to set up a star topology, thereby enabling bus users to be flexibly networked.

BRIEF DESCRIPTION OF THE DRAWINGS

Preferred embodiments of the invention will now be explained in greater detail.

DETAILED DESCRIPTION OF THE INVENTION

In the following description, similar elements are identified by identical reference numbers.

Figure 1:
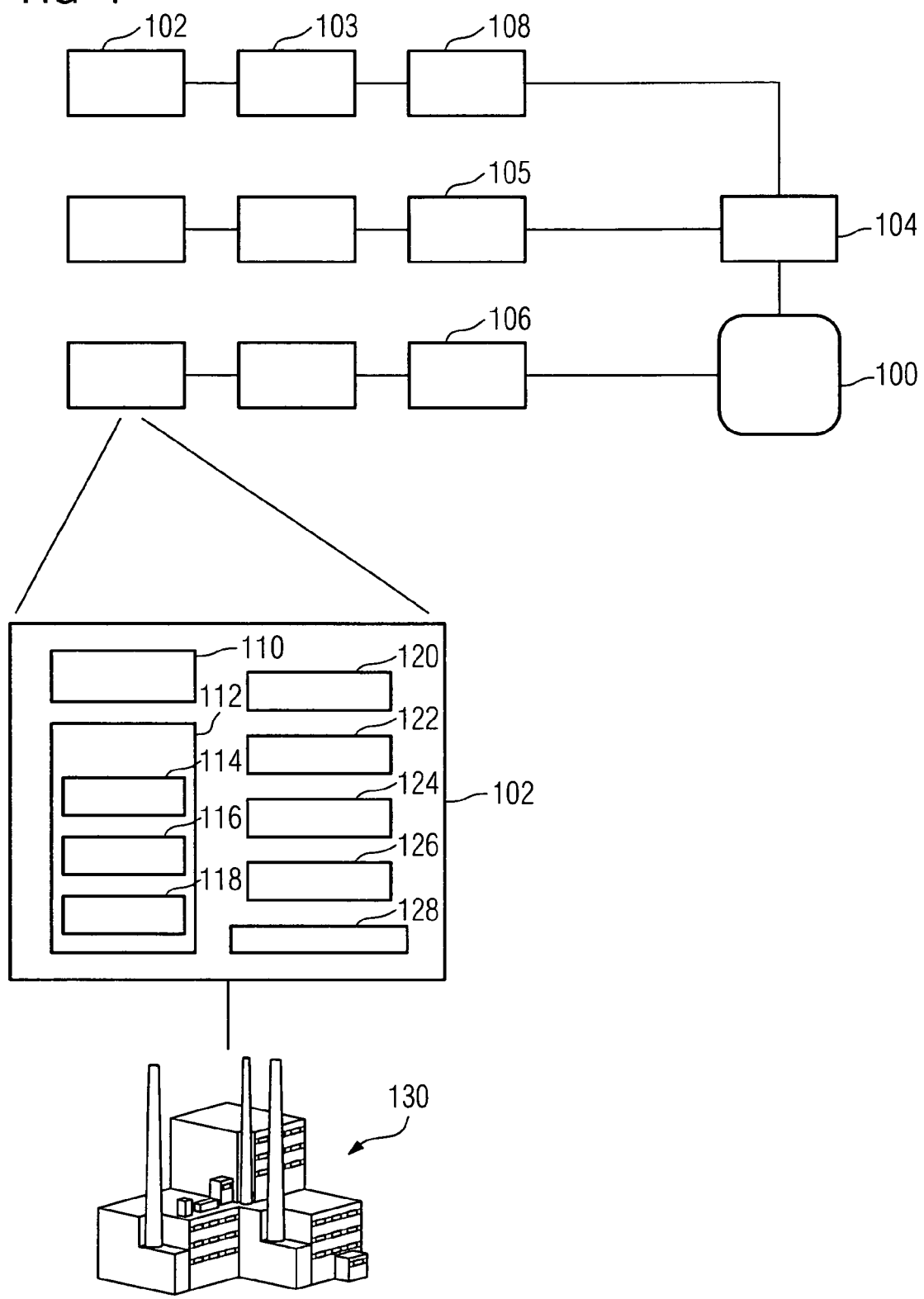
FIG. 1 shows a block diagram of a network according to the invention.

FIG. 1 shows a block diagram of an inventive network. The network comprises a control unit 100 to which a plurality of bus users are connected, some of said bus users being connected directly to the control unit 100 as bus users 106, whereas other bus users 102, 103, 108 and 105 are connected to the control unit 100 via a distribution module 104. The distribution module 104 is embodied such that it contains a table which assigns the list of identifiers of each of the bus users connected there to a physical output (port) of the distribution module. This makes it possible to create groups of bus users with particular "subsystem" identifiers, so that data telegrams intended for a group of users (e.g. group comprising bus users 102, 103 and 108) are sent exclusively to said bus users and not, for example, to the bus users in the chain with bus user 105.

FIG. 1 shows by way of example the structure of a bus user 102. The bus user 102 contains among other things a processor 110 and a memory 112 with various modules 114, 116 and 118. The bus user 102 also has a receive unit 120 for receiving data telegrams. The readout unit 122 of the bus user 102 is used for reading out data fields from a received data telegram. The transmit unit 124 of the bus user 102 is used for transmitting data telegrams with corresponding input data to other bus user or to the control unit 100. The telegram generating unit 126 is required for generating a new telegram or appending input data to an existing data telegram previously received from another bus user.

The modules 114 to 118 are e.g. modules used for checking the fulfillment of a criterion on the basis of which either a second data telegram is newly generated or on the basis of which a data telegram received from another bus user is expanded by attaching further input data. The modules also contain a component for checking the total size of the second data telegram and input data with the possibility of dividing input data between the second data telegram and/or at least one other data telegram if the total size of the second telegram and input data exceeds a predefined maximum size. In addition, one of the modules is used for generating check data (e.g. a CRC) in order to discover receive or transmit errors.

The bus user 102 also has an interface 128 which is used for connecting the bus user 102 to an automation component 130.

Figure 2:
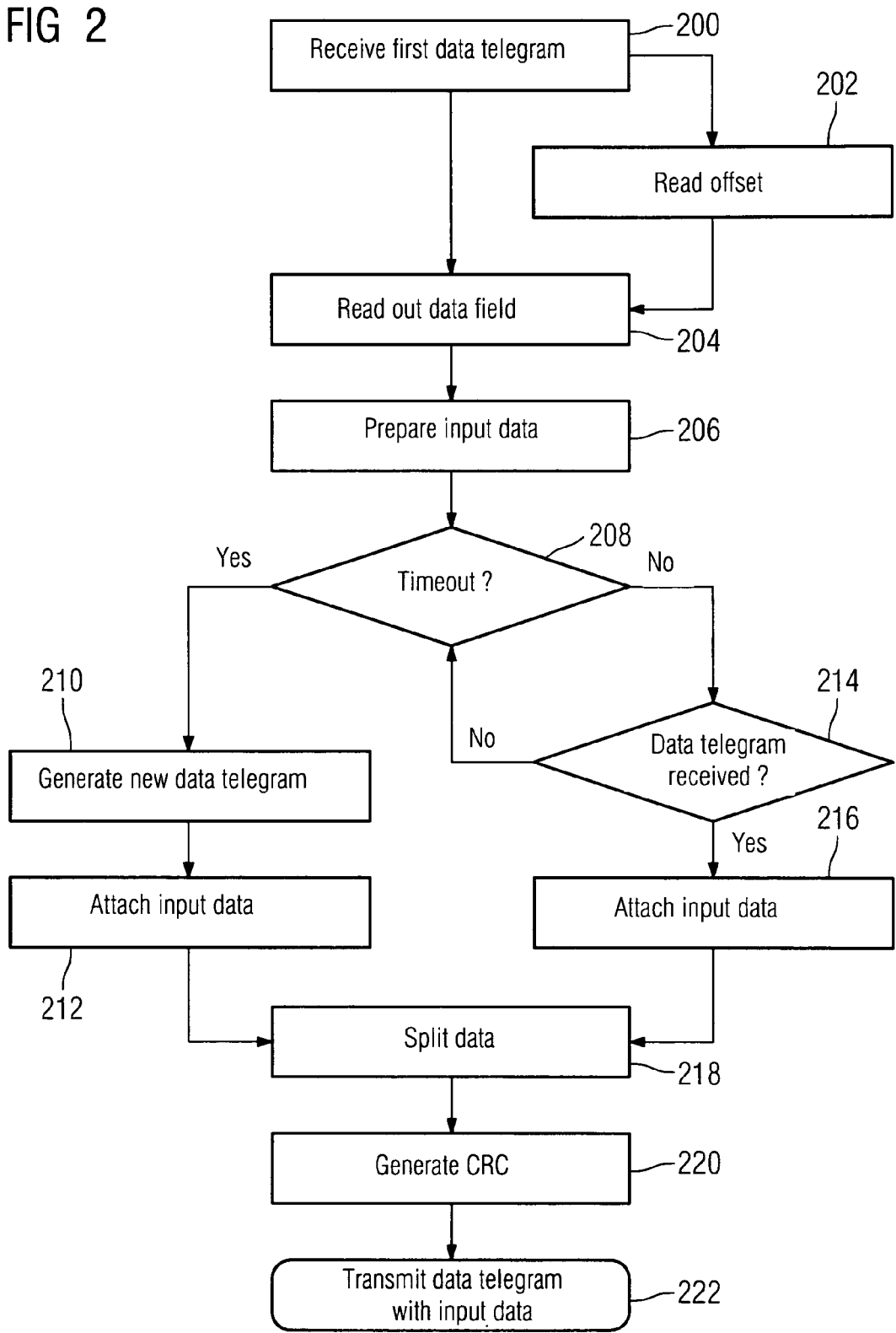
FIG. 2 shows a flowchart of an inventive method for data transmission.

In order to give an illustrative example of the mode operation of such a bus system with the inventive method for data transmission, reference is made to FIG. 2 which shows a flowchart of an inventive method for data transmission. As FIG. 2 shows, in step 200 a first data telegram is received by a bus user. In an optional step 202, an offset is read out from a table of the bus system 102 in order to filter out from a plurality of data fields that data field which is intended for the present bus user. Alternatively, in the event of the individual data fields being specially identified as predetermined for a bus user, in step 204 the corresponding data field is read out directly by the bus user.

Then, in step 206, input data preparation is performed. This can be either a specific request of the bus user to an automation component which then generates a corresponding response in the form of input data, or it can be direct access of the bus user to a predetermined memory area in which input data from the automation component has already been stored and made available in a predefined manner.

After receipt or preparation of the input data in step 206, a check is performed in step 208 to ascertain whether or not a predefined time has elapsed. Thus, for example, it may be possible that because of a time-consuming preparation of input data in step 206 a predefined time has already elapsed, so that a new data telegram is then generated by the bus user in step 210. In step 212, the input data prepared in step 206 is attached to this new data telegram.

If the evaluation in step 208 indicates that the relevant time has not yet elapsed, a check is then performed in step 214 to ascertain whether a data telegram has been received from another bus user. If no such data telegram has been received, the process continues in step 208. If step 214 indicates that a data telegram has been received from another bus user, in step 216 the input data prepared in step 206 is attached to the data telegram received.

Either after step 212 or after step 216, splitting of the data between one or more other data telegrams takes place in step 218 if the total size of the telegram data together with the input data exceeds a predefined telegram size (protocol length). After step 218, a checksum is generated in step 220, whereupon in step 222 the data telegram with the input data and checksum is transmitted to the control unit.

Figure 3:
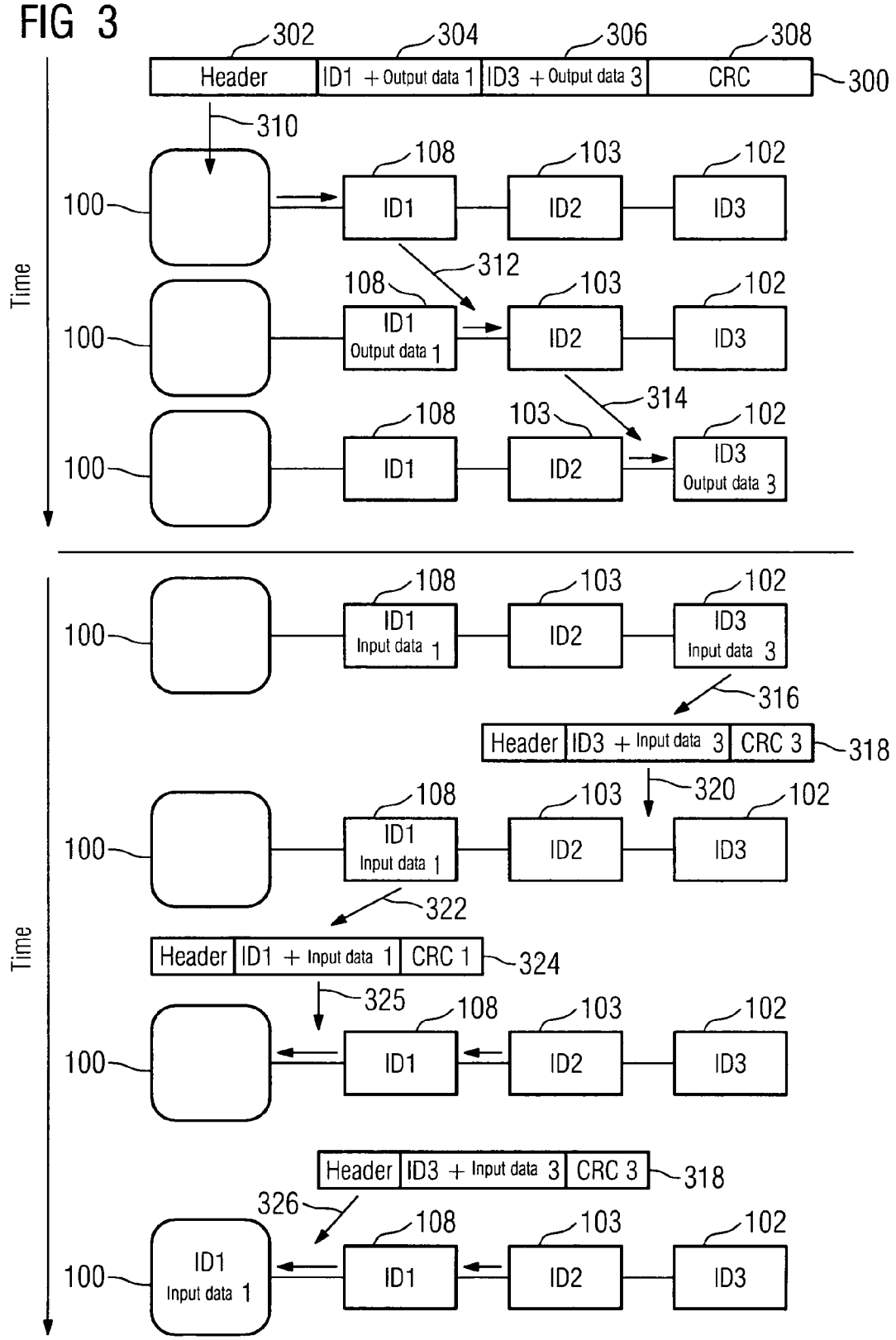
FIG. 3 shows a flowchart of an inventive method for data transmission.

FIG. 3 shows a flowchart of an inventive method for data transmission. Thus, in step 310 a first data telegram 300 is provided by the control unit 100, said first data telegram containing a header 302, a first data field 304 and a second data field 306. The first data telegram also contains a checksum (CRC) 308. In this example, the first data field contains an identifier (ID1) and associated output data 1 corresponding to the identifier. The data field 306 contains another identifier (ID3) and output data 3 associated with the identifier ID3.

After preparation of the first data telegram in step 310, the data telegram is sent by the control unit 100 to the bus user 108 with the identifier ID1. The bus user 108 now reads out the data field intended for it with the code ID1 from the first data telegram in order then, in step 312, to forward the first data telegram to the next bus user in the serial chain of bus users. The next bus user is in this case the bus user 103 with the identifier ID2. However, as the identifier ID2 does not appear in the first data telegram, in step 314 the bus user 103 immediately forwards the data telegram 300 to the next bus user in the bus user chain, in this case the bus user 102 with the identifier ID3. Analogously to the bus user 108, the bus user 102 now reads out the data field with the identifier ID3 from the first data telegram.

In the following it will now be assumed that the bus users 108 and 102 have input data 1 and input data 3 respectively available as responses to, respectively, output data 1 and output data 3. The bus user 102 as the last in the chain of bus users now generates in step 316 a second data telegram 318, said second data telegram 318 containing the identifier ID3 of the bus user 102 as well as its input data 3. The second data telegram also contains a header preferably corresponding to the header 302 previously received from the control unit 100. The second data telegram 318 additionally contains a checksum (CRC3) indicating the integrity of the second data telegram (because of defective transmission, etc.). In step 320, the second data telegram 318 thus generated is then forwarded to the next bus user 103 in the opposite direction to that in which the first data telegram 300 was previously received.

However, in the intervening period, because of a high data priority or a timeout, the bus user 108 has determined independently that it would like to transmit the input data 1 present there directly to the control unit 100. For this reason the bus user 108 generates in step 322 a third data telegram 324 containing in addition to a header and the identifier ID1 of the bus user 108 also a corresponding checksum (CRC1) for the third data telegram 324.

In step 325 the third data telegram 324 is now sent by the bus user 108 directly to the control unit 100. In the meantime the bus user 103 has forwarded the second data telegram 318 in the direction of the control unit 100, as the bus user 103 has attached no further data to said data telegram 318 because no input data is present.

Finally in step 326 the second data telegram 318 is also forwarded by the bus user 108 to the control unit 100 which in the meantime has already received the third data telegram 324 with the input data 1. Similarly to the case of the bus user 103, in step 326 once again no change is made to the data telegram 318 by the bus user 108, as the bus user 108 has no further input data available to attach.

Figure 4:
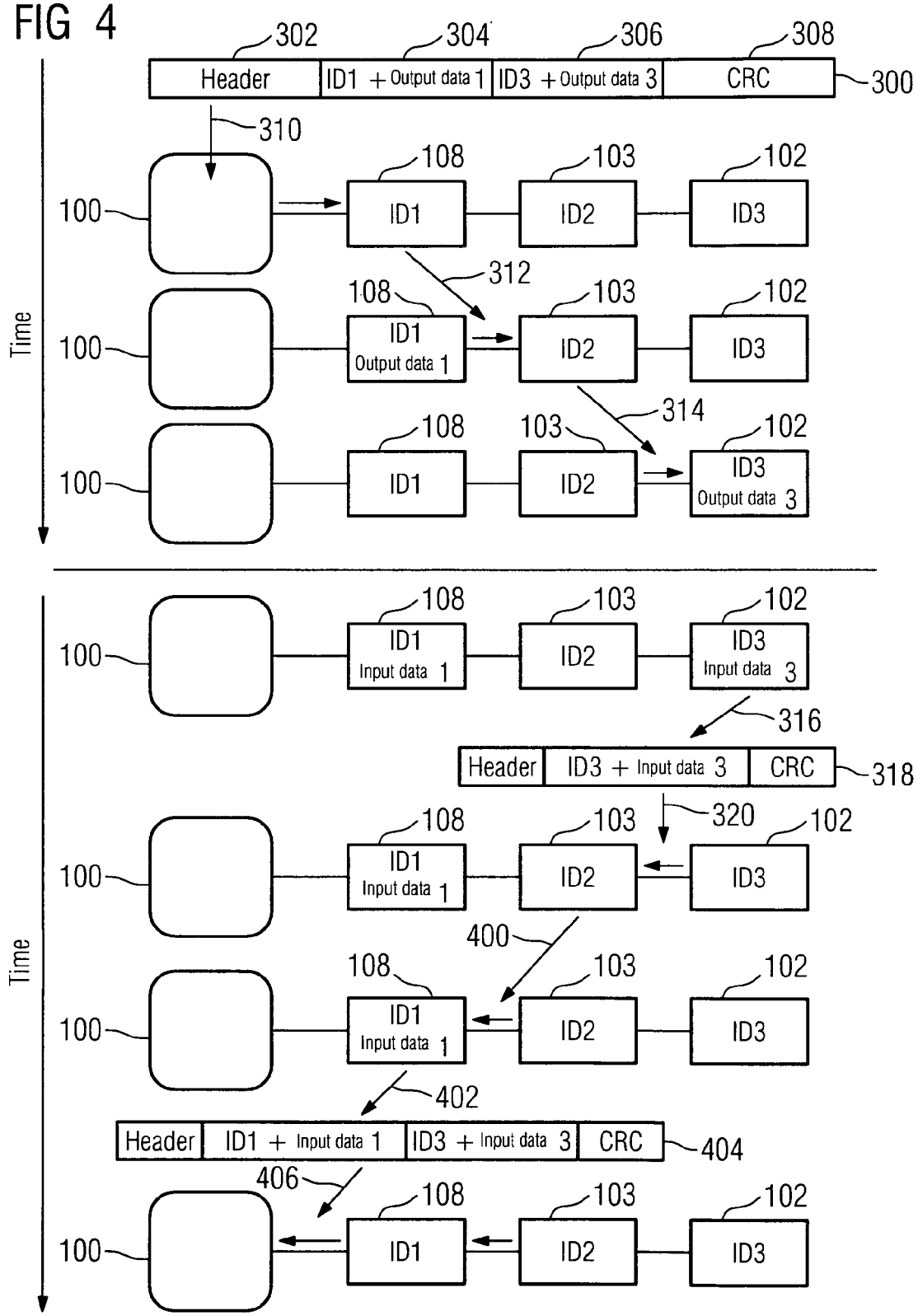
FIG. 4 shows another flowchart of an inventive method for data transmission.

FIG. 4 shows another flowchart of an inventive method for data transmission. Here it is assumed that the transmission of the first data telegram from the control unit 100 to the bus users 108, 103 and 102 corresponds to the transmission as shown in FIG. 3. However, the type of response of the relevant bus users to reception of the first data telegram now differs from FIG. 3. Similarly to FIG. 3, in step 316 a second data telegram 318 is generated by the bus user 102 in response to reception of the first data telegram 300, the second data telegram 318 containing a header, the input data 3 of the bus user 102 together with its identifier and a checksum.

In step 320, the second data telegram 318 is now forwarded by the bus user 102 to the bus user 103. As said bus user 103 has no input data available, in step 400 it immediately forwards the received second data telegram to the bus user 108. Unlike in FIG. 3, in the FIG. 4 example no time criterion is fulfilled according to which the bus user 108 would have had to individually send a response in the form of a third data telegram to the control unit 100. For this reason, at the time of step 400 the input data 1 continues to be present at the bus user 108. This means that in step 402 the bus user 108 is now able to attach its input data 1 together with the bus user 108 identifier ID1 to the received second data telegram 318, it being immaterial whether the data is attached at the start or end of the second data telegram 318. The net result is a new data telegram 404 which also contains a corresponding new checksum (CRC) which takes into account the incorporation of the additional input data 1. Finally in step 406 the new data telegram 404 is forwarded by the bus user 108 to the control unit 100 which finally evaluates the receive data telegram.

It should also be noted here that the connection of the bus users to corresponding systems which provide input data is not restricted to information components alone. These can also be a control unit or similar.

It should further be noted that synchronized data transmission between the individual bus users can also be implemented using data transmission methods according to the invention. In this case the bus users have a common time base.

The inventive method for data transmission is particularly suitable for connection to a system bus such as e.g. Profibus or PROFINET.

The invention claimed is:

1. A method for transmitting data in a serial bus system, comprising:

providing a network comprising a serial data bus, and further comprising a controller and a plurality of users connected to the bus, each user comprising a processor, a memory, a receive unit, and a transmit unit, and each user connected to an automation device for data input therefrom;

transmitting a first telegram from the controller onto the bus, wherein the first telegram comprises a plurality of data fields, each said data field identified within the telegram for one of the users;

each of the users sequentially becoming a receiving user of the first telegram via the bus, and each receiving user sequentially performing the steps of receiving the first telegram;

forwarding the first telegram onto the bus toward a subsequent receiving user;

determining if one of the data fields is identified in the first telegram for the receiving user, and, if so, reading said one of the data fields identified for the receiving user;

preparing a receiving user response; and if the automation device attached to the receiving user provides input data needed for the receiving user response within a predetermined time limit, and if a response telegram of a subsequent receiving user is received by the receiving user within the predetermined time limit,
then
  appending the receiving user response to the response telegram of the subsequent receiving user; and
  forwarding the response telegram of the subsequent receiving user toward the controller;
else
  forwarding the response telegram received from the subsequent receiving user unchanged toward the controller;

forming a new response telegram containing the receiving user response; and
  transmitting the new response telegram toward the controller;
wherein a designated last one of the receiving users jumps from the preparing step to the forming step.

2. The method of claim 1, further comprising:
if the receiving user response is one that indicates a malfunction, then jumping from the preparing step to the forming step.

* * * * *